(12) United States Patent
Furtaw et al.

(10) Patent No.: US 11,241,689 B2
(45) Date of Patent: Feb. 8, 2022

(54) MICROCHIP ELECTROPHORESIS INKJET DISPENSING

(71) Applicant: LI-COR, Inc., Lincoln, NE (US)

(72) Inventors: Michael D. Furtaw, Lincoln, NE (US); Donald T. Lamb, Lincoln, NE (US)

(73) Assignee: LI-COR, Inc., Lincoln, NE (US)

( * ) Notice: Subject to any disclaimer, the term of this patent is extended or adjusted under 35 U.S.C. 154(b) by 35 days.

(21) Appl. No.: 15/670,896

(22) Filed: Aug. 7, 2017

(65) Prior Publication Data
US 2018/0036729 A1    Feb. 8, 2018

Related U.S. Application Data

(60) Provisional application No. 62/372,244, filed on Aug. 8, 2016.

(51) Int. Cl.
*G01N 27/447* (2006.01)
*B01L 3/00* (2006.01)

(52) U.S. Cl.
CPC .... *B01L 3/50273* (2013.01); *G01N 27/44721* (2013.01); *G01N 27/44739* (2013.01);
(Continued)

(58) Field of Classification Search
CPC ... G01N 27/447–44795; G01N 30/724; G01N 30/4266; B01D 57/00–02; C02F 1/4696; B81B 1/00–008; H01J 49/0418
(Continued)

(56) References Cited

U.S. PATENT DOCUMENTS 4,631,120 A    12/1986  Pohl et al.
4,885,076 A    12/1989  Smith et al.
(Continued)

FOREIGN PATENT DOCUMENTS

CN    101581728 A    11/2009
CN    101609088 A    12/2009
(Continued)

OTHER PUBLICATIONS

U.S. Appl. No. 14/791,023, "Notice of Allowance," dated Aug. 27, 2018, 11 pages.
(Continued)

*Primary Examiner* — Bach T Dinh
(74) *Attorney, Agent, or Firm* — Kilpatrick Townsend & Stockton LLP

(57) ABSTRACT

Devices and methods are provided for the separation and dispensing of material using a microfluidic electrophoresis column, sheath liquid pump, and exit channel, all on the same monolithic chip. Material is separated in the electrophoresis column and passed into the exit chamber in response to a voltage potential between a first electrode within the electrophoresis column and a terminating electrode integrated into the chip. The terminating electrode can be in the sheath liquid pump chamber, the sheath liquid reservoir, or a separate flow channel that intersects the exit channel along with the electrophoresis column and sheath liquid pump chamber. The flow of sheath liquid into the exit chamber entrains separated analytes into an effluent that is dispensed out of the exit chamber via a discharge outlet.

20 Claims, 8 Drawing Sheets

(52) U.S. Cl.
CPC . *G01N 27/44773* (2013.01); *G01N 27/44791* (2013.01); *B01L 2300/0681* (2013.01); *B01L 2300/0829* (2013.01); *B01L 2400/0421* (2013.01); *B01L 2400/0478* (2013.01); *G01N 27/44782* (2013.01)

(58) Field of Classification Search
USPC .............. 204/450–470, 546–550, 600–621, 204/643–645
See application file for complete search history.

(56) References Cited

U.S. PATENT DOCUMENTS

| | | | |
|---|---|---|---|
| 5,094,594 | A * | 3/1992 | Brennan .......... G01N 27/44743 417/413.2 |
| 5,234,559 | A | 8/1993 | Collier et al. |
| 5,275,710 | A | 1/1994 | Gombocz et al. |
| 5,393,975 | A | 2/1995 | Hail et al. |
| 5,423,964 | A | 6/1995 | Smith et al. |
| 5,474,663 | A | 12/1995 | Brunk et al. |
| 5,868,322 | A | 2/1999 | Loucks, Jr. et al. |
| 5,916,429 | A | 6/1999 | Brunk et al. |
| 5,917,184 | A | 6/1999 | Carson et al. |
| 6,179,584 | B1 | 1/2001 | Howitz et al. |
| 6,602,391 | B2 | 8/2003 | Serikov et al. |
| 6,633,031 | B1 | 10/2003 | Schultz et al. |
| 6,787,313 | B2 | 9/2004 | Morozova et al. |
| 6,830,934 | B1 | 12/2004 | Harding et al. |
| 7,759,639 | B2 | 7/2010 | Schlaf et al. |
| 7,784,911 | B2 | 8/2010 | Kim et al. |
| 8,293,337 | B2 | 10/2012 | Bhatnagar et al. |
| 8,294,119 | B2 | 10/2012 | Arscott et al. |
| 8,470,570 | B2 | 6/2013 | Kim et al. |
| 8,613,845 | B2 | 12/2013 | Maxwell et al. |
| 9,182,371 | B2 | 11/2015 | Kennedy et al. |
| 9,465,014 | B2 | 10/2016 | Dovichi et al. |
| 2001/0055529 | A1 | 12/2001 | Wixforth |
| 2002/0197622 | A1 | 12/2002 | McDevitt et al. |
| 2003/0178563 | A1 * | 9/2003 | Makarov ............. H01J 49/0418 250/288 |
| 2003/0215855 | A1 | 11/2003 | Dubrow et al. |
| 2004/0058423 | A1 | 3/2004 | Albritton et al. |
| 2004/0113068 | A1 | 6/2004 | Bousse et al. |
| 2004/0247450 | A1 | 12/2004 | Kutchinsky et al. |
| 2004/0265182 | A1 * | 12/2004 | Chen ...................... B01D 57/02 422/503 |
| 2005/0023141 | A1 | 2/2005 | Amshey et al. |
| 2005/0040328 | A1 * | 2/2005 | Donegan ............. H01J 49/0418 250/288 |
| 2006/0192107 | A1 * | 8/2006 | DeVoe .................... B05B 5/025 250/288 |
| 2007/0035587 | A1 | 2/2007 | Lee et al. |
| 2007/0039866 | A1 | 2/2007 | Schroeder et al. |
| 2009/0060797 | A1 * | 3/2009 | Mathies .................... B01F 5/10 422/400 |
| 2011/0005932 | A1 * | 1/2011 | Jovanovich ...... G01N 35/00029 204/453 |
| 2013/0032031 | A1 | 2/2013 | Bartko et al. |
| 2013/0140180 | A1 | 6/2013 | Dovichi et al. |
| 2013/0213811 | A1 * | 8/2013 | Kennedy .......... G01N 33/54386 204/455 |
| 2013/0327936 | A1 | 12/2013 | Ramsey et al. |
| 2013/0337502 | A1 * | 12/2013 | Bo meyer ............... G01N 27/62 435/40.5 |
| 2014/0014747 | A1 | 1/2014 | Moeller et al. |
| 2014/0319335 | A1 * | 10/2014 | Morris ................. H01J 49/0454 250/282 |
| 2015/0233877 | A1 | 8/2015 | Sun et al. |
| 2015/0247187 | A1 | 9/2015 | Bermpohl |
| 2015/0279648 | A1 | 10/2015 | Furtaw et al. |
| 2016/0011149 | A1 | 1/2016 | Furtaw |
| 2016/0153944 | A1 * | 6/2016 | Douce ................... G01N 30/7266 250/288 |
| 2016/0181078 | A1 | 6/2016 | Kovarik |
| 2017/0176386 | A1 * | 6/2017 | Gentalen ........... B01L 3/502715 |
| 2017/0219522 | A1 | 8/2017 | Furtaw et al. |
| 2018/0036730 | A1 | 2/2018 | Furtaw et al. |

FOREIGN PATENT DOCUMENTS

| | | |
|---|---|---|
| CN | 101613660 A | 12/2009 |
| JP | 3775305 | 5/2006 |
| WO | 2015019159 A1 | 2/2015 |
| WO | 2015031820 A1 | 3/2015 |
| WO | 2016010748 | 1/2016 |
| WO | 2017136284 | 8/2017 |
| WO | 2018031479 | 2/2018 |
| WO | 2018031483 | 2/2018 |

OTHER PUBLICATIONS

PCT/US2017/045774, "International Preliminary Report on Patentability," dated Feb. 21, 2019, 9 pages.
PCT/US2017/045778, "International Preliminary Report on Patentability," dated Feb. 21, 2019, 9 pages.
Back et al., "Capillary Electrophoresis with Nanoparticle Matrix for DNA Analysis", Bull. Korean Chem. Soc., vol. 27, No. 1, 2006, pp. 133-136.
Ertl et al., "Capillary Electrophoresis Chips with a Sheath-Flow Supported Electrochemical Detection System", Analytical Chemistry, vol. 76, No. 13, Jul. 1, 2004, pp. 3749-3755.
Hou et al., "Direct detection and drug-resistance profiling of bacteremias using inertial microfluidics", Lab on a Chip, vol. 15, No. 10, 2015, pp. 2297-2307.
International Search Report dated Dec. 22, 2017 for corresponding PCT Appln. No. PCT/US2017/045778, 5 pages.
Shi Jin et al., "Multiplexed Western Blotting Using Microchip Electrophoresis", Analytical Chemistry, vol. 88, No. 13, Jun. 2016, pp. 6703-6710.
Amantonico et al., "Facile analysis of metabolites by capillary electrophoresis coupled to matrix-assisted laser desorption/ionization mass spectrometry using target plates with polysilazane nanocoating and grooves", Analyst, vol. 134, 2009, pp. 1536-1540.
Anderson et al., "Western Blotting using Capillary Electrophoresis", Analytical Chemistry, 2011, 1350-1355.
Avseenko et al., "Immobilization of Proteins in Immunochemical Microarrays Fabricated by Electrospray Deposition", Anal. Chem. vol. 73, 2001, pp. 6047-6052.
Avseenko et al., "Immunoassay with Multicomponent Protein Microarrays Fabricated by Electrospray Deposition", Anal. Chem., vol. 74, 2002, pp. 927-933.
Delaney et al., "Inkjet printing of proteins", Soft Matter, vol. 5, 2009, pp. 4866-4877.
Derby , "Inkjet Printing of Functional and Structural Materials: Fluid Property Requirements, Feature Stability, and Resolution", Annu. Rev. Mater. Res. 40, 2010, pp. 395-414.
Gast et al., "The development of integrated microfluidic systems at GeSiM", Lab on a Chip, 3, 2003, pp. 6N-10N.
Han et al., "BioPen: direct writing of functional material at the point of care", Scientific Reports vol. 4, Article No. 4872, 2014, pp. 1-5.
Helmja et al., "Fraction collection in capillary electrophoresis for various stand-alone mass spectrometers", Journal of Chromatography A, vol. 1216, 2009, pp. 3666-3673.
Jaworek et al., "Electrospraying route to nanotechnology: An overview", Journal of Electrostatics, vol. 66, 2008, pp. 197-219.
Jin et al., "Western Blotting Using Microchip Electrophoresis Interfaced to a Protein Capture Membrane", Analytical Chemistry 85(12), 2013, 6073-6079.
Johnson et al., "A CE-MALDI Interface Based on the Use of Prestructured Sample Supports", Anal. Chem.,vol. 73, 2001, pp. 1670-1675.
Kim et al., "Design and evaluation of single nozzle with a non-conductive tip for reducing applied voltage and pattern width in electrohydrodynamic jet printing (EHDP)", J. Micromech. Microeng, vol. 20, 2010, pp. 7.

(56) References Cited

OTHER PUBLICATIONS

Korkut et al., "Enhanced Stability of Electrohydrodynamic Jets through Gas Ionization", PRL,vol. 100, 2008, pp. 034503-1-034503-4.

Lu et al., "Coupling Sodium Dodecyl Sulfate-Capillary Polyacrylamide Gel Eletrophoresis with Matrix-Assisted Laser Desorption Ionization Time-of-Flight Mass Spectrometry via a Poly(tetrafluoroethylene) Membrane", Anal. Chem., vol. 83, 2011, pp. 1784-1790.

Magnusdottir et al., "Micropreparative capillary electrophoresis of DNA by direct transfer onto a membrane", Electrophoresis, vol. 18, 1997, pp. 1990-1993.

Martin et al., "Inkjet printing—the physics of manipulating liquid jets and drops", Engineering and Physics-Synergy for Success, IOP Publishing, Journal of Physics: Conference Series 105, 2008, pp. 1-14.

Morozov et al., "Electrospray Deposition as a Method for Mass Fabrication of Mono- and Multicomponent Microarrays of Biological and Biologically Active Substances", Anal. Chem., vol. 71, 1999, pp. 3110-3117.

Morozov et al., "Electrospray Deposition as a Method to Fabricate Functionally Active Protein Films", Anal. Chem, 1999, pp. 1415-1420.

International Search Report and written opinion for PCT/US2015/039121 dated Sep. 30, 2015, 9 pages.

International Search Report and Written Opinion for PCT/US2017/015657 dated Apr. 4, 2017, 18 pages.

Written Opinion for PCT/US2017/015657 dated Aug. 31, 2017, 14 pages.

Rejtar et al., "Off-Line Coupling of High-Resolution Capillary Electrophoresis to MALDI-TOF and TOF/TOF MS", Journal of Proteome Research, vol. 1(2), 2002, pp. 171-179.

Tracht et al., "Postcolumn Radionuclide Detection of Low-Energy β Emitters in Capillary Electrophoresis", Anal. Chem, 1994, pp. 2382-2389.

Uematsu et al., "Surface morphology and biological activity of protein thin films produced by electrospray deposition", Journal of Colloid and Interface Science, vol. 269, 2004, pp. 336-340.

Wei et al., "Electrospray sample deposition for matrix-assisted laser desorption/ionization (MALDI) and atmospheric pressure MALDI mass spectrometry with attomole detection limits", Rapid Commun. Mass Spectrom, 2004, pp. 1193-1200.

Zhang et al., "Capillary Electrophoresis Combined with Matrix-Assisted Laser Desorption/Ionization Mass Spectrometry; Continuous Sample Deposition on a Matrix-precoated Membrane Target," Journal of Mass Spectrometry, Journal of Mass Spectrometry, , vol. 31, 1996, pp. 1039-1046.

Zhong et al., "Recent advances in coupling capillary electrophoresis-based separation techniques to ESI and MALDI-MS", Electrophoresis, vol. 35, 2014, pp. 1214-1225.

U.S. Appl. No. 15/420,496, "Non-Final Office Action," dated Aug. 7, 2019, 11 pages.

U.S. Appl. No. 15/670,939, "Non-Final Office Action," dated Jul. 12, 2019, 15 pages.

European Application No. EP17747982.1, "Extended European Search Report," dated Aug. 7, 2019, 10 pages.

Smith et al., "Sample Introduction and Separation in Capillary Electrophoresis, and Combination with Mass Spectrometric Detection," Talanta, vol. 36, No. 1/2, 1989, pp. 161-169.

Application No. CN201780047883.3, Office Action, dated Jan. 6, 2021, 12 pages.

Application No. CN201780047902.2, Office Action, dated Jan. 6, 2021, 9 pages.

U.S. Appl. No. 15/670,896, Advisory Action, dated Jul. 9, 2021, 3 pages.

AU2017213725, First Examination Report, dated May 7, 2021, 2 pages.

\* cited by examiner

MICROCHIP ELECTROPHORESIS INKJET DISPENSING

CROSS-REFERENCES TO RELATED APPLICATIONS

The present application claims the benefit of U.S. Provisional Appln. No. 62/372,244 filed Aug. 8, 2016, the full disclosure which is incorporated herein by reference in its entirety for all purposes.

STATEMENT AS TO RIGHTS TO INVENTIONS MADE UNDER FEDERALLY SPONSORED RESEARCH AND DEVELOPMENT

This invention was made with government support under Grant No. 1R43GM112289-01 awarded by the National Institutes of Health. The government has certain rights in the invention.

BACKGROUND

Western blotting is a ubiquitous analytical technique for identifying and quantifying specific proteins in a complex mixture. In the technique, gel electrophoresis is used to separate proteins in a gel based on properties such as tertiary structure, molecular weight, isoelectric point, polypeptide length, or electrical charge. Once separated, the proteins are then transferred from the gel to a membrane—typically made of nitrocellulose, nylon, or polyvinylidene fluoride (PVDF)—that binds proteins non-specifically. A commonly used method for carrying out this transfer is electroblotting, in which an electrical current is used to pull proteins from the gel into the membrane. The membrane is then stained with probes specific for the proteins being targeted, allowing the location and amounts of these proteins to be detected.

Capillary electrophoresis provides an alternative to the gel electrophoresis separation associated with western blotting and other biotechnology procedures. In capillary electrophoresis, materials such as proteins are separated electrokinetically, as in gel electrophoresis, but with much smaller required volumes. The capillaries used in this technique are typified by diameters smaller than one millimeter and are in some instances incorporated into microfluidic or nanofluidic devices.

Previous work has demonstrated the benefits of applying microfluidic devices to Western blotting of proteins (Jin et al. 2013 *Anal. Chem.* 85:6073). These devices electrically transfer separated proteins to a blotting surface that is itself the terminating electrode. (See, e.g., U.S. Pat. No. 9,182,371). This electrical field blotting approach requires continuous electrical contact from a separation device to the surface. As a result, the surface must be electrically conductive (e.g., a wet membrane on metal platen).

In electric field blotting, proteins migrate toward the surface via electrophoresis. Since the cross-sectional area of the current flow abruptly increases upon exiting the separation device, the electric field abruptly diminishes. Also, since the surface is typically wet, a large meniscus tends to form around the point of contact between the separation device and the surface. This large meniscus can comprise recirculation zones in which analytes such as proteins can be trapped and mixed, reducing the resolution of separation. Furthermore, the electrical field blotting force is only applied while the separation device is above the analyte. If a surface and separation device move to a different position relative to one another, the electrical force is removed and only diffusion forces cause the analyte to become immobilized in the surface membrane.

Alternative dispensing techniques such as, for example, inkjetting of material, can address some of the above issues. Inkjet dispensing is a mature and well-understood technology that is often used in commercial printers (Martin et al. 2008 *J. Physics: Conference Series* 105:012001). Over the past several years, inkjet technology has been used in an increasing variety of applications where the dispensing of small, controllable amounts of fluid is required (Derby 2010 *Ann. Rev. Mat. Res.* 40:395).

BRIEF SUMMARY

In general, provided herein are devices and methods for the dispensing of small, controllable amounts of material that have been separated by microfluidic electrophoresis. The separated material outputs from an electrophoretic column into an exit channel. Bulk flow of a sheath fluid passes through the exit channel and entrains the analytes in an effluent that is discharged from the exit channel through an outlet. Each of the electrophoresis column, exit channel, and sheath flow pump are integrated on a single chip. The electrophoretic flow is driven by a voltage potential between two electrodes that are also integrated onto the chip. The terminating electrode can be located within a separate flow channel that is also connected to the exit channel such that material flows electrophoretically from the electrophoresis column towards the flow channel and into the exit channel. Multiple electrophoresis columns can be integrated onto the same chip. A terminating electrode within a single common flow channel can be used to generate multiple voltage potentials with multiple electrodes located within multiple electrophoresis columns.

One provided apparatus comprises an electrophoresis column having an input end and an output end, wherein the input end has an opening configured to accept a fluid sample. The apparatus further comprises a first electrode proximate to and in fluidic connection with the input end of the electrophoresis column. The apparatus further comprises a sheath liquid reservoir. The apparatus further comprises a pump chamber connected to the sheath liquid reservoir, wherein the pump comprises an impulsive pump element. The apparatus further comprises an exit channel having an upstream end and a downstream end. The upstream end is connected to the pump chamber and the downstream end has a discharge outlet. The output end of the electrophoresis column intersects the exit channel. The apparatus further comprises a second electrode in fluidic connection with the exit chamber.

In some embodiments, the second electrode is within the pump chamber. In some embodiments, the apparatus further comprises a flow channel, wherein the flow channel intersects the exit channel. In some embodiments, the second electrode is within or upstream of the flow channel. In some embodiments, the apparatus further comprises a sieving matrix, wherein the sieving matrix is inside the electrophoresis column.

In some embodiments, the impulsive pump element comprises a piezoelectric material configured to deform at least a portion of the pump chamber. The impulsive pump element comprises a thermoresistive element configured to form a bubble in a sheath liquid when the sheath liquid is within the pump chamber. In some embodiments, the impulsive pump element comprises an solenoid valve configured to alternatingly open and close. In some embodiments, In some embodiments, the electrophoresis column, pump chamber, and exit channel are integrated on a single monolithic chip.

In some embodiments, the apparatus further comprises a surface positioned across a gap from the discharge outlet. In some embodiments, the apparatus further comprises a motor configured to move the surface laterally with respect to the discharge outlet. In some embodiments, the apparatus further comprises a motor configured to move the discharge outlet laterally with respect to the surface. In some embodiments, the surface comprises a hydrophobic material. In some embodiments, the surface comprises a hydrophilic material. In some embodiments, the surface includes a blotting membrane. In some embodiments, the surface comprises a matrix-assisted laser desorption/ionization (MALDI) plate. In some embodiments, the surface comprises a microtiter plate.

Also provided is an apparatus comprising a first and second electrophoresis column. The first electrophoresis column has a first input end and a first output end, and the second electrophoresis column has a second input end and a second output end. The first input end has a first opening configured to accept a first fluid sample, and the second output end has a second opening configured to accept a second fluid sample. The apparatus further comprises a first and second electrode. The first electrode is proximate to and in fluidic connection with the first input end of the first electrophoresis column, and the second electrode is proximate to and in fluidic connection with the second input end of the second electrophoresis column. The apparatus further comprises a first and second sheath liquid reservoir. The apparatus further comprises a first and second pump chamber. The first pump chamber is connected to the first sheath liquid reservoir, and the second pump chamber is connected to the second sheath liquid reservoir. The apparatus further comprises a first and second impulsive pump element. The first impulsive pump element is configured to impulsively deform at least a portion of the first pump chamber, and the second impulsive pump element is configured to impulsively deform at least a portion of the second pump chamber. The apparatus further comprises a first and second exit channel. The first exit channel has a first upstream end and a first downstream end, and the second exit channel has a second upstream end and a second downstream end. The first upstream end is connected to the first pump chamber, and the second upstream end is connected to the second pump chamber. The first downstream end has a first discharge outlet, and the second downstream end has a second discharge outlet. The first output end of the first electrophoresis column intersects the first exit channel, and the second output end of the second electrophoresis column intersects the second exit channel. The apparatus further comprises a common flow channel, wherein the common flow channel intersects the first and second exit channels. The apparatus further comprises a third electrode within the common flow channel.

In some embodiments, the first and second electrophoresis columns, first and second pump chambers, common flow channel, and first and second exit channels are integrated on a single monolithic chip.

Also provided is a method of dispensing one or more analytes from an electrophoresis column. The method comprises applying a voltage potential between an input end of an electrophoresis column and an output end of the electrophoresis column, wherein the voltage potential continues outside of the output end and into an exit channel. The output end of the electrophoresis column intersects the exit channel. The exit channel has an upstream end and a downstream end. The upstream end of the exit channel is connected to a pump chamber, and the downstream end of the exit channel has a discharge outlet. The pump chamber is connected to a sheath liquid reservoir. The voltage is sufficient to electrophorese one or more analytes from the input end of the electrophoresis column to the output end of the electrophoresis column. The method further comprises impulsively deforming the pump chamber sufficiently to pump a sheath liquid from the sheath liquid reservoir to the exit channel. The method further comprises entraining the one or more analytes in the sheath liquid to form an effluent. The method further comprises dispensing the effluent through the discharge outlet of the exit channel.

In some embodiments, the voltage potential continues outside of the output end of the electrophoresis column, through a portion of the exit channel, and into the pump chamber. In some embodiments, the voltage potential continues outside of the output end of the electrophoresis column, through a portion of the exit channel, and into a flow channel, wherein the flow channel intersects the exit channel.

In some embodiments, the dispensing creates one or more droplets. In some embodiments, the dispensing creates a stream. In some embodiments, the method further comprises contacting the dispensed effluent with a surface. In some embodiments, the method further comprises moving the surface relative to the discharge outlet. In some embodiments, the method further comprises moving the discharge outlet relative to the surface. In some embodiments, the surface comprises a hydrophobic material. In some embodiments, the surface comprises a hydrophilic material. In some embodiments, the surface includes a blotting membrane. In some embodiments, the surface comprises a matrix-assisted laser desorption/ionization (MALDI) plate. In some embodiments, the surface comprises a microtiter plate.

Also provided is a method of dispensing two or more analytes from two electrophoresis columns. The method comprises applying a first voltage potential between a first input end of a first electrophoresis column and a common flow channel. A first output end of the first electrophoresis column intersects a first exit channel, and the common flow channel intersects the first exit channel. The first exit channel has a first upstream end and a first downstream end. The first upstream end of the first exit channel is connected to a first pump chamber, and the first downstream end of the first exit channel has a first discharge outlet. The first pump chamber is connected to a first sheath liquid reservoir. The first voltage is sufficient to electrophorese one or more of the two or more analytes from the first input end of the first electrophoresis column to the first output end of the first electrophoresis column. The method further comprises applying a second voltage potential between a second input end of a second electrophoresis column and the common flow channel. A second output end of the second electrophoresis column intersects a second exit channel, and the common flow channel intersects the second exit channel. The second exit channel has a second upstream end and a second downstream end. The second upstream end of the second exit channel is connected to a second pump chamber, and the second downstream end of the second exit channel has a second discharge outlet. The second pump chamber is connected to a second sheath liquid reservoir. The second voltage is sufficient to electrophorese one or more of the two or more analytes from the second input end of the second electrophoresis column to the second output end of the second electrophoresis column. The method further comprises impulsively deforming the first pump chamber sufficiently to pump a first sheath liquid from the first sheath liquid reservoir to the first exit channel. The method further comprises impulsively deforming the second pump chamber sufficiently to pump a second sheath liquid from the second sheath liquid reservoir to the second exit channel. The method further comprises entraining one or more of the two or more analytes in the first sheath liquid to form a first effluent, and entraining one or more of the two or more analytes in the second sheath liquid to form a second effluent. The method further comprises dispensing the first effluent through the first discharge outlet of the first exit channel, and dispensing the second effluent through the second discharge outlet of the second exit channel.

In some embodiments, each dispensing step creates one or more droplets. In some embodiments, each dispensing step creates a stream. In some embodiments, the method further comprises contacting the dispensed first and second effluents with a surface. In some embodiments, the method further comprises moving the surface relative to the first and second discharge outlets. In some embodiments, the method further comprises moving the first and second discharge outlets relative to the surface. In some embodiments, the surface comprises a hydrophobic material. In some embodiments, the surface comprises a hydrophilic material. In some embodiments, the surface includes a blotting membrane. In some embodiments, the surface comprises a matrix-assisted laser desorption/ionization (MALDI) plate. In some embodiments, the surface comprises a microtiter plate.

DETAILED DESCRIPTION

Embodiments of the present invention relate to the dispensing of material output from one or more microfluidic separation columns. The material is dispensed by using inkjet technology to "jet" proteins or other separated analytes from the separation column and onto a surface. The use of the inkjet technology relieves any electrical requirements of the surface substrate.

The disclosed embodiments can be used to enable high-resolution blotting of molecules onto a solid support as they elute from a separation column. The blotting can be, for example, analogous to western blotting. The disclosed embodiments can work with a wide variety of dispensed droplet sizes (e.g., 10 pL-10 nL) and frequencies (e.g., 0-10,000 Hz). Biomolecules are not fragmented during the separation and dispensing processes. The separation column can be spatially isolated from the solid support with no need to maintain a liquid connection. Antibodies and/or blocking reagents can be dispensed with low volume consumption. This and other dispensing processes can be operated independently of any separation process. Blotting can be with the use of discrete drops to maintain separation resolution and enable novel detection strategies. Furthermore, hydrophobic surface substrates can be used to gain sensitivity by concentrating dispensed material to smaller dot sizes. Fraction collection operations are also enabled with the disclosed embodiments. These fraction collection operations using material separated with microfluidics can be as straightforward as common fraction collection operations typically used with material separated with larger-scale chromatography. The use of microfluidics can further enable faster separations, better resolution, the use of smaller sample amounts, the elimination of tubing connections and "dead volume" within the system, and the enabling of massive parallelization.

Figure 1:
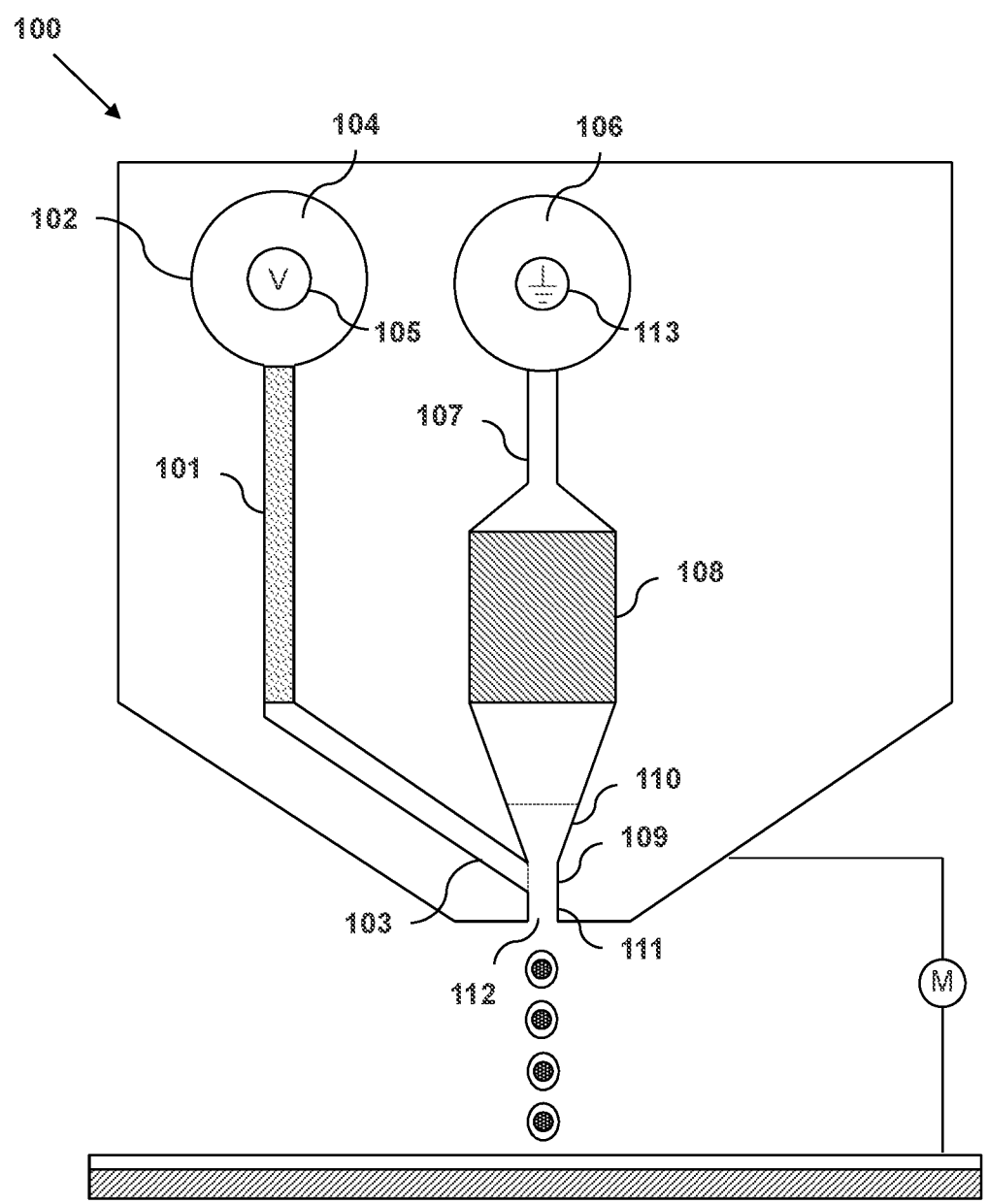
FIG. 1 illustrates a microfluidic separation and dispensing device in accordance with an embodiment and having a terminating electrode upstream of a pump chamber.

FIG. 1 illustrates a microfluidic separation and dispensing apparatus in accordance with an embodiment. Shown in device 100 is an electrophoresis column 101 having an input end 102 and an output end 103. The input end 102 has an opening 104 configured to accept a fluid sample. A first electrode 105 is proximate to and in fluid connection with the input end 102 of the electrophoresis column 101. Also shown is a sheath liquid reservoir 106, and a pump chamber 107 connected to the sheath liquid reservoir. An impulsive pump element 108 is configured to impulsively deform at least a portion of the pump chamber 107. Also shown is an exit channel 109 having an upstream end 110 and a downstream end 111. The upstream end 110 of the exit channel 109 is connected to the pump chamber 107. The downstream end 111 of the exit channel 109 has a discharge outlet 112. The output end 103 of the electrophoresis column 101 intersects with the exit channel 109. A second electrode 113 is in fluidic connection with the exit chamber 109.

The term "fluidic connection" as used herein refers to a connection between two or more enclosed or semi-enclosed volumes, such that a fluid within one of the volumes can flow to each of the other volumes. In this way, the volumes in fluidic connection with one another form a hydraulic circuit. It is to be understood that a fluid need not be present in any of the volumes for the volumes to be in fluidic connection with one another.

Figure 2:
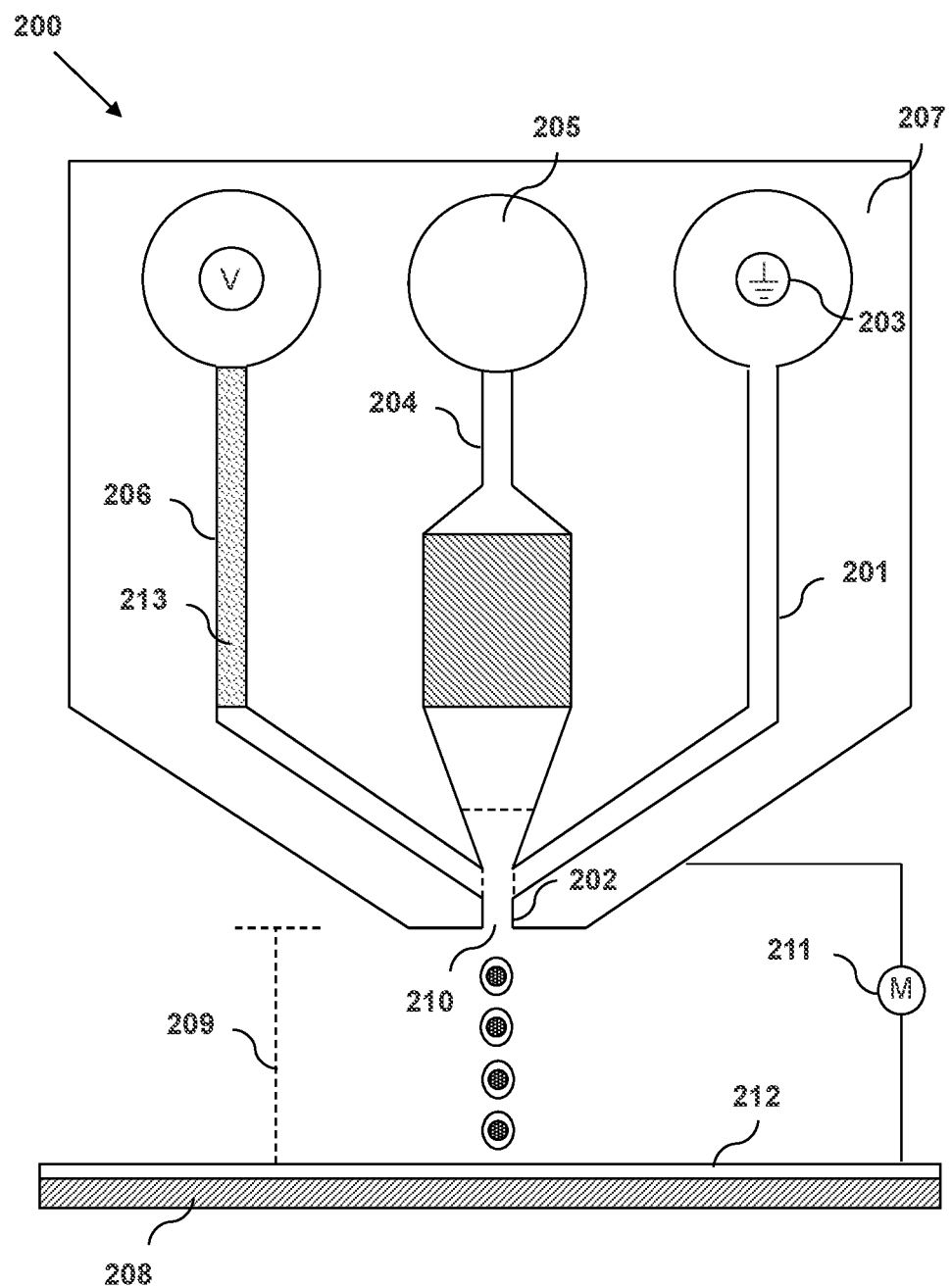
FIG. 2 illustrates a microfluidic separation and dispensing device in accordance with an embodiment and having a terminating electrode within a flow channel.

FIG. 2 illustrates another microfluidic separation and dispensing apparatus in accordance with an embodiment. The device 200 of FIG. 2 is similar to that depicted in FIG. 1, further comprising a flow channel 201 that intersects the exit channel 202. The second electrode 203 of device 200 is within the flow channel 201, and not within the pump chamber 204 or sheath flow reservoir 205, as is shown in FIG. 1. The flow channel 201 is on the same single monolithic chip 207 as the electrophoresis column 206, pump chamber 204, and exit channel 202.

The electrophoresis column can be formed from, for example, plastic or fused silica. In some embodiments, the diameters of the input and output ends of the electrophoresis column are in a range from about 5 µm to about 500 µm. In some embodiments, the diameters of the input and output ends are about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameters of the input and/or output ends can be, for example and without limitation, within the range between 1 μm and 60 μm, between 2 μm and 130 μm, between 4 μm and 250 μm, between 8 μm and 500 μm, or between 15 μm and 1000 μm. The diameters of the input and/or output ends can be within the range between 5 μm and 80 μm, between 8 μm and 125 μm, between 12 μm and 200 μm, between 20 μm and 325 μm, or between 30 μm and 500 μm.

The first and second electrodes can be formed from any conducting or semiconducting material. For example, one or both or the electrodes can comprise a metal. In some embodiments, the metal is gold or platinum. In some embodiments, one or both of the electrodes are platinum or can be platinum-plated. One or both of the electrodes can be substantially cylindrical in shape, as in a wire. One or both of the electrodes can be substantially flattened in shape so as to increase their surface area.

The sheath liquid reservoir can have a volume of less than 10 ml, less than 6.5 ml, less than 4 ml, less than 2.5 ml, less than 1.5 ml, less than 1 ml, less than 650 μl, less than 400 μl less than 250 μl, less than 150 μl, less than 100 μl, less than 65 μl, less than 40 μl, less than 25 μl, less than 15 μl, or less than 10 μl. The sheath liquid reservoir can, for example and without limitation, have a volume within the range between 10 μl and 650 μl, between 20 μl and 1.25 ml, between 40 μl and 2.5 ml, between 80 μl and 5 ml, or between 150 μl and 10 ml.

The pump chamber can be formed from, for example, plastic or fused silica. In some embodiments, the diameter of the pump chamber is in a range from about 5 μm to about 500 μm. In some embodiments, the diameter of the pump chamber is 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm. The diameter of the pump chamber can be, for example and without limitation, within the range between 1 μm and 60 μm, between 2 μm and 130 μm, between 4 μm and 250 μm, between 8 μm and 500 μm, or between 15 μm and 1000 μm. The diameter of the pump chamber can be within the range between 5 μm and 80 μm, between 8 μm and 125 μm, between 12 μm and 200 μm, between 20 μm and 325 μm, or between 30 μm and 500 μm.

The impulsive pump element can alter the physical properties of the pump chamber by transferring or converting energy into an acoustic wave. The impulsive pump element can alter the physical properties of the pump chamber by adjusting a mechanical stress on the pump chamber. The impulsive pump can be a thermal inkjet, wherein the impulsive pump element is a thermoresistive material. The impulsive pump can comprise a solenoid valve configured to rapidly open and close. The impulsive pump element can have a deformable surface. The deformable surface can be configured to expand, to contract, or both. The movement of the deformable surface alters the volume of the pump internal region. As the volume of the pump internal region decreases, the pressure of material within the pump internal region increases. In this way, the pump can affect pressure-driven flow of sheath liquid from the sheath liquid reservoir to the exit channel.

The impulsive pump can comprise a piezoelectric material. In some embodiments, the impulsive pump comprises a piezoelectric crystal. In some embodiments, the impulsive pump comprises lead zirconate titanate. The impulsive pump can comprise a thermoresistive material. The impulsive pump can be electrically connected to an impulsive pump actuator. In some embodiments, the impulsive pump actuator can transmit a signal to the impulsive pump causing it to expand.

The exit channel can have a substantially constant cross-sectional diameter along its length from the upstream end to the downstream end. The exit channel can be tapered such that the cross-sectional diameter of the exit channel proximate to the discharge outlet is smaller than the cross-sectional area of the exit channel proximate to the output end of the electrophoresis column. In some embodiments, the entire internal region of the exit channel is tapered. In some embodiments, only the portion of the exit region proximate to the discharge outlet is tapered. The tapering can be such that the cross-sectional area of the exit channel decreases linearly along the longitudinal axis of the exit channel. The tapering can be such that cross-sectional area of the exit channel decreases nonlinearly along the longitudinal axis of the exit channel. In a preferred embodiment, the exit channel substantially does not taper.

The discharge outlet can have any shape that is capable of allowing the formation of droplets of dispensed fluid. The discharge outlet can have a circular or ovoid shape. The discharge outlet can have a triangular, rectangular, or other polygonal shape. The discharge outlet shape can have two or more axes of symmetry. The discharge outlet can be symmetrical along three axis. The diameter or major axis of the discharge outlet can be larger than, equal to, or smaller than the diameter of the capillary outlet. In some embodiments, the diameter of the discharge outlet is within the range from about 5 μm to about 200 μm. The diameter of the discharge outlet can be in the range between about 5 μm and about 500 μm. The diameter of the discharge outlet can be, for example, in a range between about 5 μm and about 80 μm, between about 10 μm and about 125 μm, between about 15 μm and about 200 μm, between about 20 μm and about 300 μm, or between about 30 μm and about 500 μm. The diameter of the discharge outlet can be between about 20 μm and about 60 μm, between about 25 μm and about 70 μm, between about 30 μm and about 85 μm, between about 35 μm and about 100 μm, or between about 40 μm and about 125 μm. In some embodiments, the diameter of the discharge outlet is about 50 μm. In some embodiments, the diameter of the discharge outlet is about 1 μm, 5 μm, 10 μm, 20 μm, 30 μm, 40 μm, 50 μm, 60 μm, 70 μm, 80 μm, 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm, 300 μm, 310 μm, 320 μm, 330 μm, 340 μm, 350 μm, 360 μm, 370 μm, 380 μm, 390 μm, 400 μm, 410 μm, 420 μm, 430 μm, 440 μm, 450 μm, 460 μm, 470 μm, 480 μm, 490 μm, 500 μm, 600 μm, 700 μm, 800 μm, 900 μm, or 1000 μm.

In a preferred embodiment, the discharge outlet is located along a centerline of the exit channel. Alternatively, the discharge outlet can offset from the centerline of the exit channel. Preferably, at least a portion of the exit channel proximate to the discharge outlet has a substantially smooth surface. As used herein, the term "substantially smooth" refers to a surface that is completely or mostly free of texturing such as voids, protrusions, grooves, or ridges. A surface can have minor indentations or raised portions, or other imperfections not intended during manufacture, and still be considered to be substantially smooth. The smoothness of the exit channel and discharge outlet can depend at least in part on aspects of the manufacturing process (e.g., polishing, dicing, scribing, or lasering), and can influence the morphology of droplets dispensed from the device.

The electrophoresis column 206, pump chamber 204, and exit channel 202 of device 200 of FIG. 2 can all be located on a single monolithic chip 207. The chip can comprise, for example, one or more of silicon, glass, polydimethylsiloxane (PDMS), polymethylmethacrylate (PMMA), cyclic olefin polymer (COP), cyclic olefin copolymer (COC) or quartz.

Also shown in FIG. 2 is a surface 208 that is positioned across a gap 209 from the discharge outlet 210. In some embodiments, the surface comprises an electrically insulating material. In some embodiments, the surface comprises an electrically conductive material. In some embodiments, the surface comprises a hydrophilic material. In some embodiments, the surface comprises a hydrophobic material. In some embodiments, the surface comprises a matrix-assisted laser desorption/ionization (MALDI) plate. For example, the surface can be a metal plate configured to receive spotting of a solution containing MALDI samples. In some embodiments, the surface comprises a microtiter plate. For example, the surface can be the inner surface of a well of a microtiter plate, or can be an array of 6, 24, 96, 384, 1536, or other number of wells forming a microtiter plate.

In some embodiments, the surface is wet. In some embodiments, the surface is dry. The use of a dry surface can be advantageous for multiple reasons. One advantage of a dry surface is the elimination of any operating complexities associated with the maintaining of a consistently wet membrane. Another advantage is that a dry membrane can provides a capillary, or "wicking", force as an effluent exits the discharge outlet. As discussed below, this can assist with immobilization of proteins or other analytes.

In some embodiments, the discharge outlet contacts the surface. In some embodiments, the surface is positioned across a gap from the discharge outlet and the discharge outlet does not contact the surface. Because the terminating electrode is located on the chip of the device, there is not an electrical requirement for the surface, and the surface and an effluent exiting from the discharge outlet do not require continuous electrical contact. The surface can be a dry membrane, plastic, glass, etc. In some embodiments, the surface is located about 0.1 mm, 0.2 mm, 0.3 mm, 0.4 mm, 0.5 mm, 0.6 mm, 0.7 mm, 0.8 mm, 0.9 mm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, or 100 mm from the discharge outlet. The gap between the surface and the discharge outlet can be, for example and without limitation, within the range between 0.1 mm and 6 mm, between 0.2 mm and 12 mm, between 0.4 mm and 25 mm, between 0.8 mm and 50 mm, or between 2 mm and 100 mm.

In some embodiments, the surface is a component of a fraction collection device. In some embodiments, the surface is located within a well of a microtiter plate. The microtiter plate can comprise an array of a plurality of wells. The number of wells arrayed on the microtiter plate can be, for example, 6, 24, 96, 384, 1536, 3456, or 9600, or more.

Also shown in FIG. 2 is a motor 211 configured to move one or both of the surface 208 or the chip 207. The motor can be configured to move the surface laterally with respect to the discharge outlet. The motor can be configured to move the discharge outlet laterally with respect to the surface. The motor can be, for example, a stepper motor, small brushed direct current (DC) motor, or brushless DC motor. The motor can be an element of a robotic apparatus that is programmed or otherwise configured to automate and/or regulate the operation of the motor. Movement can be continuous or semi-continuous. Movement can stop intermittently for sample or fraction collection.

Because the terminating electrode is located within a flow channel of the device, the discharge outlet and/or surface can be moved away from one another without interrupting the separation process. This can increase the throughput of separation and dispensing by allowing other electrical processes, such as those associated with separations or sample injections, to continue while the discharge outlet and/or surface are moved relative to one another. This also enables fraction collection operations in which an effluent stream or series of droplets is first collected in one well before the device is repositioned above an adjacent well while the separation processes continue.

Also shown in FIG. 2 is a blotting membrane 212 that is an optional element of the surface 208. In some embodiments, the surface is a blotting membrane that can be useful for performing a western immunoassay or other membrane analysis methods such as northern blotting and Southern blotting. The method can further comprise applying a detection reagent to such a blotting membrane. The detection reagent can be an antibody such as a primary or secondary antibody.

The term "antibody" includes a polypeptide encoded by an immunoglobulin gene or functional fragments thereof that specifically binds and recognizes an antigen. Immunoglobulin genes include the kappa, lambda, alpha, gamma, delta, epsilon, and mu constant region genes, as well as the myriad immunoglobulin variable region genes. Light chains are classified as either kappa or lambda. Heavy chains are classified as gamma, mu, alpha, delta, or epsilon, which in turn define the immunoglobulin classes, IgG, IgM, IgA, IgD and IgE, respectively. The term antibody activity, or antibody function, refers to specific binding of the antibody to the antibody target.

A primary antibody will be understood by one of skill to refer to an antibody or fragment thereof that specifically binds to an analyte (e.g., substance, antigen, component) of interest. The primary antibody can further comprise a tag, e.g., for recognition by a secondary antibody or associated binding protein (e.g., green fluorescent protein, biotin, or strepavidin).

A secondary antibody refers to an antibody that specifically binds to a primary antibody. A secondary antibody can be specific for the primary antibody (e.g., specific for primary antibodies derived from a particular species) or a tag on the primary antibody (e.g., GFP, biotin, or strepavidin). A secondary antibody can be bispecific, e.g., with one variable region specific for a primary antibody, and a second variable region specific for a bridge antigen.

Blotting membranes can comprise, for example, nitrocellulose, nylon, polyvinylidene difluoride, or combinations of one or more of these materials. The blotting membrane can further comprise a support material. The support material can be, for example, glass, plastic, metal, ceramic or other inert surface.

In some embodiments, a region of the membrane immediately across from the discharge outlet is dry until wetted by an effluent exiting from the discharge outlet. The effluent can be in the form of, for example, a continuous stream, a semi-continuous stream, or discrete droplets. In some embodiments, the degree of hydrophobicity of the surface affects the surface area of droplets once contacted with the surface. In general, for aqueous droplets, as the hydrophobicity of the surface increases, the contact angle of the droplets with the surface will decrease. This decreased contact angle can allow the distances between adjacent droplets on the surface to be reduced while still preventing droplets from coalescing or otherwise combining with one another. In this way, the use of a hydrophobic surface material can enable a greater concentration of distinct droplets to be dispensed onto the surface. Also, for each individual droplet, the concentration of dispensed material per unit of area of the contacted surface material will increase. In some embodiments, this increased concentration can lead to greater signal intensities for applications such as western blotting.

In some embodiments, the surface material is selected such that adjacent droplets dispensed onto the surface remain distinct. These embodiments can generate dispensed patterns that maintain the resolution of the separation of material within the separation column and the dispensing apparatus. In some embodiments, the surface material is selected such that adjacent droplets dispensed onto the surface coalesce. Through movement of one or both of the surface and/or the dispensing apparatus during dispensing, these embodiments can generate dispensed patterns that are continuous linear or curved representations of the separation of material within the electrophoresis column.

The effluent can comprise an analyte. In some embodiments, the effluent is wicked into the membrane. In some embodiments, the analyte becomes immobilized in the membrane upon wicking of the effluent into the membrane. In some embodiments, the effluent is pulled toward the dry membrane until the substrate is saturated. Therefore, for embodiments in which the surface and/or discharge outlet move relative to one another, the immobilization force may continue in membrane surface locations that are no longer directly beneath the discharge outlet. At relatively low sheath flow rates (typically <1 µl/min) the meniscus between the discharge outlet and the membrane can be narrow and recirculation zones can be minimal.

Any of the devices described above can be used to separate one or more analytes moving within the separation column. An "analyte" includes a substance of interest such as a biomolecule. Biomolecules are molecules of a type typically found in a biological system, whether such molecule is naturally occurring or the result of some external disturbance of the system (e.g., a disease, poisoning, genetic manipulation, etc.), as well as synthetic analogs and derivatives thereof. Non-limiting examples of biomolecules include amino acids (naturally occurring or synthetic), peptides, polypeptides, glycosylated and unglycosylated proteins (e.g., polyclonal and monoclonal antibodies, receptors, interferons, enzymes, etc.), nucleosides, nucleotides, oligonucleotides (e.g., DNA, RNA, PNA oligos), polynucleotides (e.g., DNA, cDNA, RNA, etc.), carbohydrates, hormones, haptens, steroids, toxins, etc. Biomolecules can be isolated from natural sources, or they can be synthetic.

The analytes can be, for example, proteins, nucleic acids, carbohydrates, lipids, or any other type of molecule. In some embodiments, the analytes are proteins that are present in the separation column in their native state. In some embodiments, the analytes are proteins that have been mixed with sodium dodecyl sulfate to cause their partial or complete denaturation.

Also shown in FIG. 2 is a sieving matrix 213 inside the electrophoresis column 206. Protein and DNA size-based separation techniques often rely on gels or polymer solutions to resolve populations of biomolecules. These gels and polymer solutions create a random sieving media through which the biomolecules migrate, separating the molecules by size as they pass through the media. The composition and porosity of conventional separation media can be modified to produce pores of different average sizes within the media.

The sieving matrix can contain a substantially heterogeneous or substantially homogeneous assortment of pore sizes. The sieving matrix can comprise nanoparticles, beads, macromolecules, a colloidal crystal, a gel, a polymer solution, or other medium. The sieving matrix can comprise silica nanoparticles that form a colloidal crystal, providing a separation media which has a substantially monodisperse pore size, based on the monodispersity of the silica colloid size and the crystallization of the colloids. The use of separation media comprising silica nanoparticles is further discussed in U.S. Patent Application Publication No. 2015/0279648A1, as published Oct. 1, 2015, which is entirely incorporated by reference herein for all purposes.

The sieving matrix can comprise, for example, one or more of sodium dodecyl sulfate (SDS), polyvinylpyrrolidone (PVP), polyethylene oxide (PEO), polylactic acid (PLA), polyethylene glycol (PEG), polydimethylacrylamide (PDMA), acrylamide, polyacrylamide, methylcellulose, hydroxypropylmethyl cellulose (HPMC), hydroxypropyl cellulose (HPC), hydroxyethyl cellulose (HEC), agarose gel, or dextran.

Also provided are devices that comprise a plurality of individual dispensing units. The dispensing units can be configured in a linear array. The dispensing units can be configured in a 2-dimensional array. In some embodiments, the device comprises 1, 2, 4, 8, 12, or more dispensing units. The dispensing units can each be connected to the same supply of sheath liquid. The dispensing units can each be connected to different supplies of sheath liquid.

Figure 3:
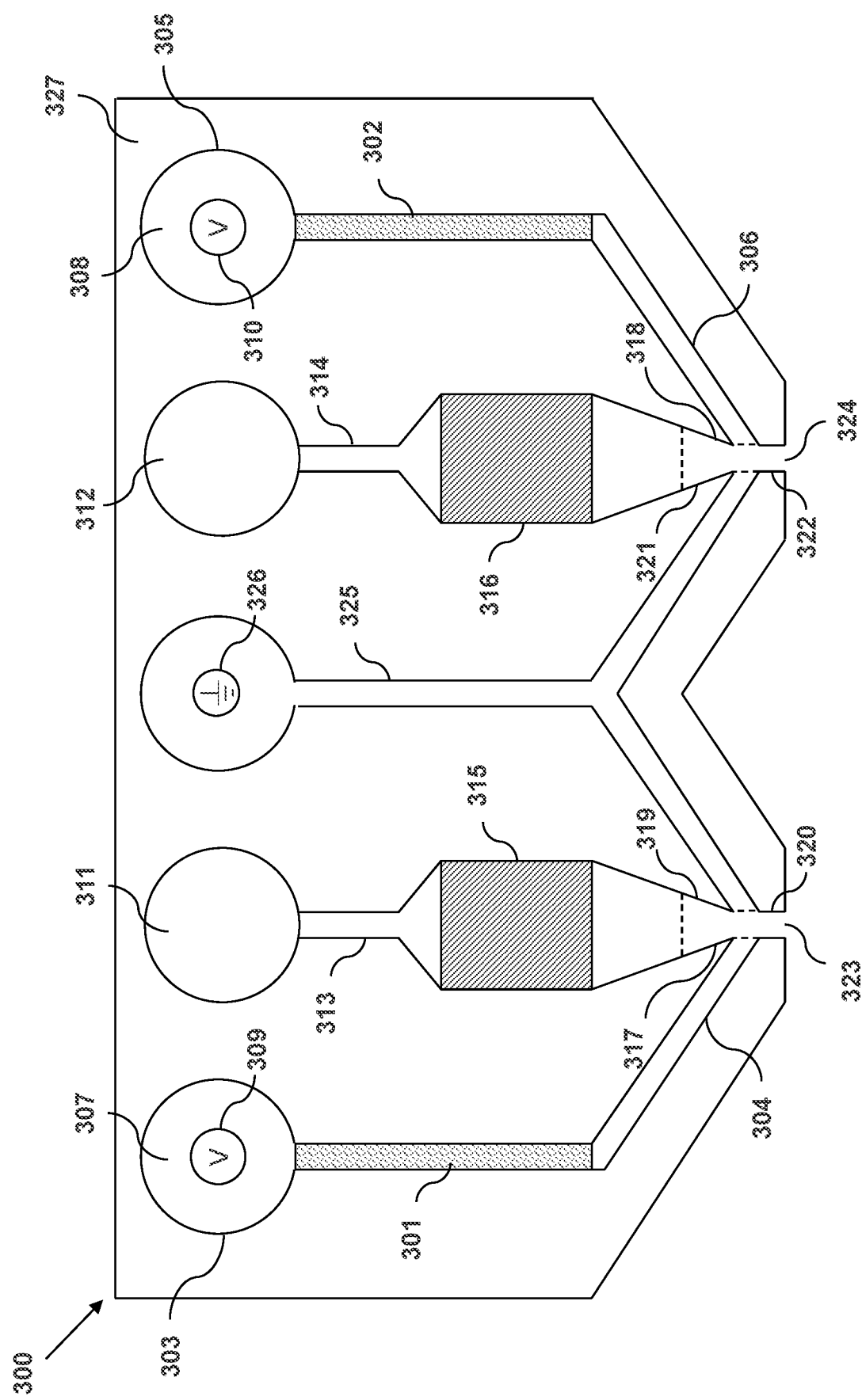
FIG. 3 illustrates a microfluidic separation and dispensing device in accordance with an embodiment and having two electrophoresis columns and a terminating electrode within a common flow channel.

FIG. 3 illustrates another microfluidic separation and dispensing apparatus in accordance with an embodiment. Shown in device 300 are a first 301 and second 302 electrophoresis column. The first electrophoresis column 301 has a first input end 303 and a first output end 304, and the second electrophoresis column 302 has a second input end 305 and a second output end 306. The first input end 303 has a first opening 307 configured to accept a first sample, and the second input end 305 has a second opening 308 configured to accept a second sample.

Also shown in FIG. 3 are a first 309 and second 310 electrode. The first electrode 309 is proximate to and in fluidic connection with the first input end 303 of the first electrophoresis column 301, and the second electrode 310 is proximate to and in fluidic connection with the second input end 305 of the second electrophoresis column 302. Also shown are a first 311 and second 312 sheath liquid reservoir. A first pump chamber 313 is connected to the first sheath liquid reservoir 311, and a second pump chamber 314 is connected to the second sheath liquid reservoir 312. A first impulsive pump element 315 is configured to impulsively deform at least a portion of the first pump chamber 313, and a second impulsive pump chamber 316 is configured to impulsively deform at least a portion of the second pump chamber 314.

Also shown in FIG. 3 are a first 317 and second 318 exit channel. The first exit channel 317 has a first upstream end 319 and a first downstream end 320, and the second exit channel 318 has a second upstream end 321 and a second downstream end 322. The first upstream end 319 is connected to the first pump chamber 313, and the second upstream end 321 is connected to the second pump chamber 314. The first downstream end 320 has a first discharge outlet 323, and the second downstream end 322 has a second discharge outlet 324. The first output end 304 of the first electrophoresis column 301 intersects the first exit channel 317, and the second output end 306 of the second electrophoresis column 302 intersects the second exit channel 318. Also shown is a common flow channel 325 that intersects both the first 317 and second 318 exit channels. A third electrode 326 is within the common flow channel 325. In some embodiments, and as is shown in FIG. 3, each of the first 301 and second 302 electrophoresis columns, the first 313 and second 314 pump chambers, the first 317 and second 318 exit channels, and the common flow channel 325 are integrated on a single monolithic chip 327.

The common flow channel can be formed from, for example, plastic or fused silica. In some embodiments, the diameter of the common flow channel is in a range from about 5 µm to about 500 µm. In some embodiments, the diameter of the common flow channel is about 1 µm, 5 µm, 10 µm, 20 µm, 30 µm, 40 µm, 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 600 µm, 700 µm, 800 µm, 900 µm, or 1000 µm. The diameter of the common flow channel can be, for example and without limitation, within the range between 1 µm and 60 µm, between 2 µm and 130 µm, between 4 µm and 250 µm, between 8 µm and 500 µm, or between 15 µm and 1000 µm. The diameter of the common flow channel can be within the range between 5 µm and 80 µm, between 8 µm and 125 µm, between 12 µm and 200 µm, between 20 µm and 325 µm, or between 30 µm and 500 µm.

The third electrode can be formed from any conducting or semiconducting material. For example, the third electrode can comprise a metal. In some embodiments, the metal is gold or platinum. In some embodiments, the third electrode is platinum or can be platinum-plated. The third electrode can be substantially cylindrical in shape, as in a wire. The third electrode can be substantially flattened in shape so as to increase their surface area.

Although the above description is of a device using two columns to dispense two or more analytes, it is appreciated that a similar device can comprise three or more columns to dispense three or more analytes. For example, a device can comprise three, four, five, six, seven, eight, nine, ten, or more than ten columns. Such devices can further comprise multiple sheath liquid reservoirs, pump chambers, and exit channels, each configured to be in fluidic connection with one of the multiple columns. Such devices can further comprise multiple common channels, each configured to connect with adjacent pairs of exit channels on the device.

Figure 4:
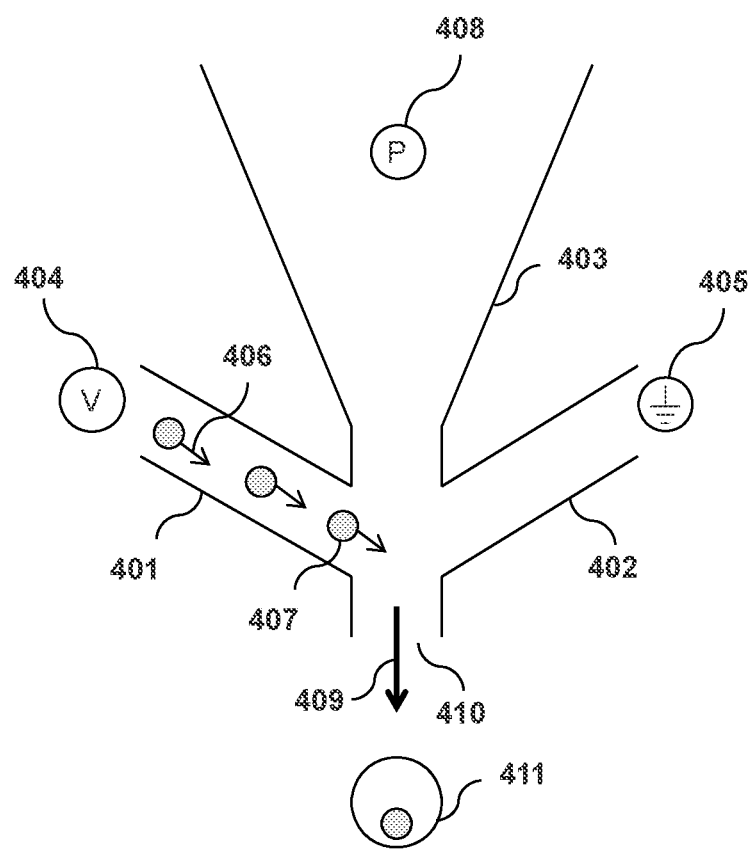
FIG. 4 illustrates an intersection between an electrophoresis column, a flow channel, and an exit channel, wherein the intersection is configured as a cross.

FIG. 4 illustrates an intersection between an electrophoresis column 401, a flow channel 402, and an exit channel 403, wherein the intersection is configured as a cross. A voltage potential between a first electrode 404 located within the electrophoresis column 401 and a second electrode 405 located within the flow channel 402 can drive electrophoretic flow 406 of separated analytes 407 through the electrophoresis column 401 and into the exit channel 403. A pump 408 generates bulk flow 409 through the exit channel 403 and out a discharge outlet 410. The bulk flow 409 sweeps analyte 407 passing through the intersection out of the discharge outlet 410 in the form of an effluent droplet 411.

Figure 5:
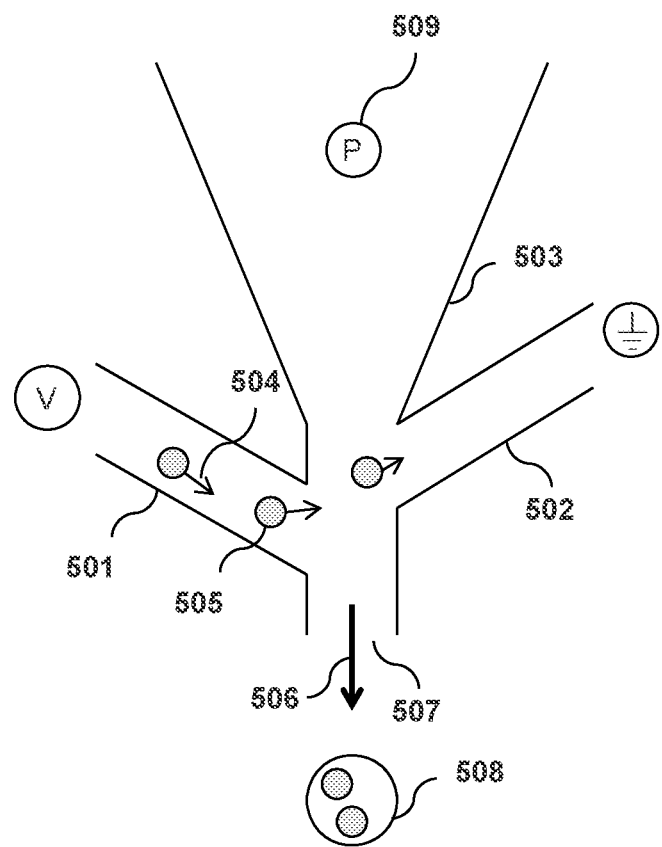
FIG. 5 illustrates an intersection between an electrophoresis column, a flow channel, and an exit channel, wherein the intersection is configured as an offset cross.

FIG. 5 illustrates a different intersection between an electrophoresis column 501, a flow channel 502, and an exit channel 503, wherein the intersection is configured as an offset cross. With the configuration shown in FIG. 5, the electrophoretic flow 504 of separated analytes 505 causes the analytes to travel further upstream in the exit channel 503 relative to the direction of bulk flow 506 as compared to the configuration shown in FIG. 4. This can increase the residence time of analytes 505 within the exit channel 503. As a result, more analyte 505 can be swept out of the discharge outlet 507 in each effluent droplet 508 while the pump 509 is configured to produce droplets at a lower frequency than with the device configuration shown in FIG. 4.

Figure 6:
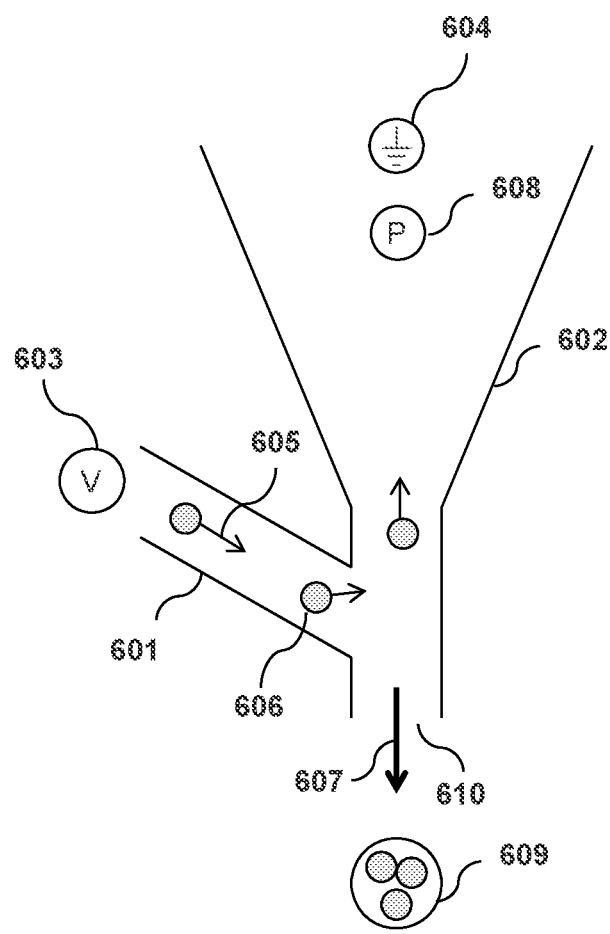
FIG. 6 is illustrates an intersection between an electrophoresis column and an exit channel.

FIG. 6 illustrates a different intersection between an electrophoresis column 601 and an exit channel 602. A voltage potential between a first electrode 603 located within the electrophoresis column 601 and a second electrode 604 located within the exit channel 602 can drive electrophoretic flow 605 of separated analytes 606 through the electrophoresis column 601 and into the exit channel 602. With the configuration shown in FIG. 6, the analytes can travel further upstream in the exit channel 602 relative to the direction of bulk flow 607 as compared to the configurations shown in FIGS. 4 and 5. This can further increase the residence time of analytes 606 within the exit channel 602. The pump 608 can be configured to periodically clear the exit channel 602 by producing one or more effluent droplets 609 to sweep accumulated analytes 606 out of through the discharge outlet 610. In this way, the device can operate somewhat similarly to a traditional fraction collector, but with much higher separation and resolution capabilities.

Figure 7:
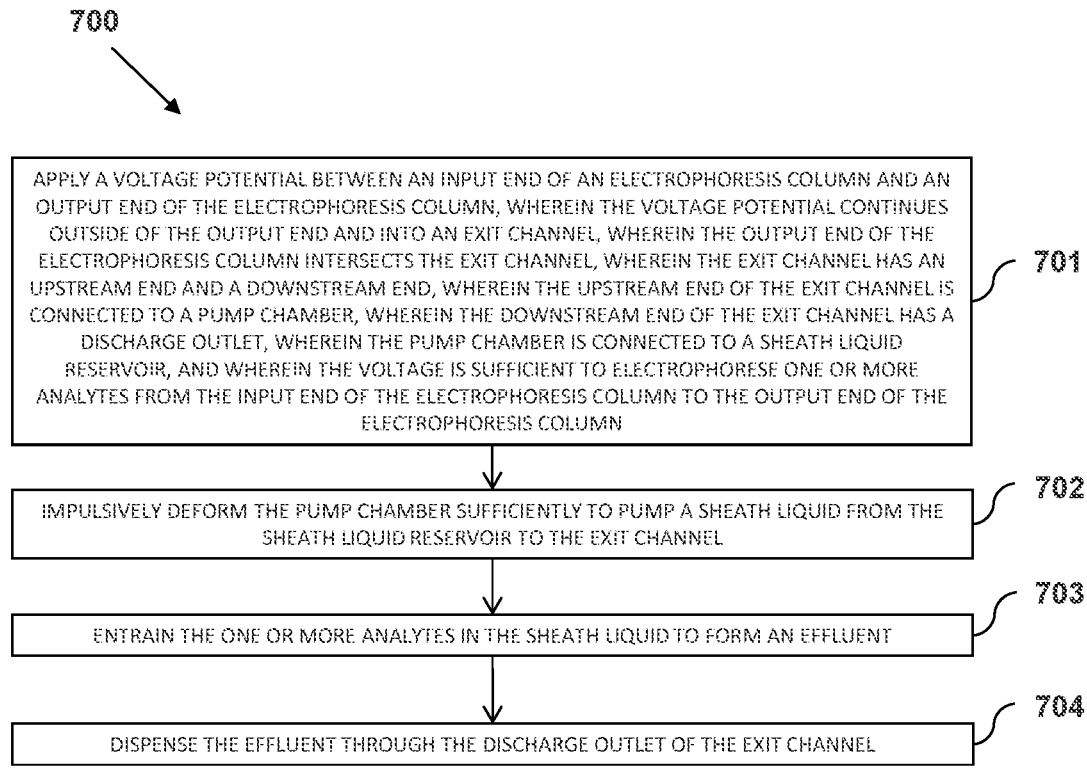
FIG. 7 is a flowchart of a process for separating and dispensing an analyte from an electrophoresis column in accordance with an embodiment.

FIG. 7 presents a flowchart of a process 700 for dispensing one or more analytes from an electrophoresis column. In operation 701, a voltage potential is applied between an input end of an electrophoresis column and an output end of the electrophoresis column. The voltage potential continues outside of the output end and into an exit channel. The output end of the electrophoresis column intersects the exit channel, wherein the exit channel has an upstream end and a downstream end. The upstream end of the exit channel is connected to a pump chamber, and the downstream end of the exit channel has a discharge outlet. The pump chamber is connected to a sheath liquid reservoir. The voltage is sufficient to electrophorese one or more analytes from the input end of the electrophoresis column to the output end of the electrophoresis column. In operation 702, the pump chamber is impulsively deformed sufficiently to pump a sheath liquid from the sheath liquid reservoir to the exit channel. In operation 703, the one or more analytes are entrained in the sheath liquid to form an effluent. In operation 704, the effluent is dispensed through the discharge outlet of the exit channel.

The voltage at the first electrode is held at a different voltage than that at the second electrode. The difference in voltages causes analytes in the separation column to separate from one another in a technique known as electrophoresis.

Electrophoresis is the induced motion of particles suspended in a fluid by an electric field, or as otherwise known in the art. Electrophoresis of positively charged particles (cations) is often called cataphoresis, while electrophoresis of negatively charged particles (anions) is often called anaphoresis.

The power for applying a voltage can supply an electric field having voltages of about 1 V/cm to 2000 V/cm. In some embodiments, the voltage is about 1 V/cm, 10 V/cm, 20 V/cm, 30 V/cm, 40 V/cm, 50 V/cm, 60 V/cm, 70 V/cm, 80 V/cm, 90 V/cm, 100 V/cm, 150 V/cm, 200 V/cm, 250 V/cm, 300 V/cm, 350 V/cm, 400 V/cm, 450 V/cm, 500 V/cm, 550 V/cm, 600 V/cm, 650 V/cm, 700 V/cm, 750 V/cm, 800 V/cm, 850 V/cm, 900 V/cm, 950 V/cm, 1000 V/cm, 1050 V/cm, 1100 V/cm, 1150 V/cm, 1200 V/cm, 1250 V/cm, 1300 V/cm, 1350 V/cm, 1400 V/cm, 1450 V/cm, 1500 V/cm, 1550 V/cm, 1600 V/cm, 1650 V/cm, 1700 V/cm, 1750 V/cm, 1800 V/cm, 1850 V/cm, 1900 V/cm, 1950 V/cm, or 2000 V/cm. The voltage can be, for example and without limitation, within the range between 1 V/cm and 100 V/cm, between 2 V/cm and 200 V/cm, between 5 V/cm and 400 V/cm, between 10 V/cm and 900 V/cm, or between 20 V/cm and 2000 V/cm. Higher voltages can also be used, depending on the particular separation method.

Motion of analytes or other material within the separation column can occur solely through electrophoresis. There can also be a bulk fluid flow through the separation column that contributes to the motion of analytes or other material. In some embodiments, the analytes or other materials within the separation column move only through the action of bulk fluid flow within the tube.

In certain aspects, the electrophoresis systems and methods of the present invention resolve or separate the analyte as a function of the pI of the analyte. The isoelectric point (pI) is the pH at which a particular molecule carries no net electrical charge. Other suitable techniques for resolution or separation include, but are not limited to, electrophoresis, isoelectric focusing, isotachophoresis, ion exchange chromatography, cation exchange chromatography, and hydrophobic interaction chromatography. Resolution can also be conducted using affinity chromatography, wherein separation results from interaction of one or more analytes with binding moieties such as antibodies, lectins, and aptamers, in the separation bed.

In some embodiments, one or more analytes are separated within the the separation column by isoelectric focusing prior to subsequent movement of the analytes within the column by a bulk fluid flow. In some embodiments, one or more analytes are moved within the separation column by a bulk fluid flow prior to their subsequent separation within the column by isoelectric focusing. In one provided embodiment of a method, an isoelectric focusing step is used to separate one or more analytes within the column, a bulk fluid flowing step is used to move the one or more analytes into the dispensing apparatus, and a dispensing step is used to dispense the one or more analytes onto a surface.

The movement of material within the exit channel is determined in part by the presence, directions, and magnitudes of sheath liquid flows, bulk fluid flow output from the separation column, and an electrical field within the separation column and the exit channel. In some embodiments, the contribution of bulk fluid flow is greater than that of an electrical field, and accordingly the movement of material within the exit channel is in a direction substantially towards the discharge outlet.

In some embodiments, the method further comprises controlling the pressure of the sheath liquid in the sheath liquid reservoir that is in fluidic connection with the pump chamber. In some embodiments, the method further comprises controlling the pressure of an electrophoresis solution in an electrophoresis solution reservoir that is in fluidic connection with the electrophoresis column.

The liquid that exits the microfluidic discharge outlet can consist entirely of sheath liquid. The liquid that exits the microfluidic nozzle can consist entirely of material that is output from the capillary electrophoresis tube. In some embodiments, the liquid that exits the microfluidic nozzle comprises a mixture of sheath liquid and material that is output from the capillary electrophoresis tube, wherein the percentage of the mixture that comprises sheath liquid is about 0%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%. The percentage of sheath fluid in the effluent liquid can be, for example and without limitation, within the range between 0% and 60%, between 10% and 70%, between 20% and 80%, between 30% and 90%, or between 40% and 100%.

In some embodiments, the voltage potential continues outside of the output end of the electrophoresis column, through a portion of the exit channel, and into the pump chamber. In some embodiments, the voltage potential continues outside of the output end of the electrophoresis column, through a portion of the exit channel, and into a flow channel, wherein the flow channel intersects the exit channel.

The dispensing can generate the formation of a continuous or discontinuous stream exiting the discharge outlet. The dispensing can generate the formation of droplets exiting the discharge outlet. The droplets can have volumes in the range from about 10 picoliter to about 10 nanoliter. The frequency of the droplets can be in a range from 0 to about 10,000 Hz.

The term "droplet" refers to a small volume of liquid, typically with a spherical shape, encapsulated by an immiscible fluid, such as a continuous phase or carrier liquid of an emulsion. In some embodiments, the volume of a droplet and/or the average volume of droplets is, for example, less than about one microliter (or between about one microliter and one nanoliter or between about one microliter and one picoliter), less than about one nanoliter (or between about one nanoliter and one picoliter), or less than about one picoliter (or between about one picoliter and one femtoliter), among others. In some embodiments, a droplet has a diameter (or an average diameter) of less than about 1000, 100, or 10 micrometers, or of about 1000 to 10 micrometers, among others. A droplet can be spherical or nonspherical. A droplet can be a simple droplet or a compound droplet, that is, a droplet in which at least one droplet encapsulates at least one other droplet.

The droplets can be monodisperse, that is, of at least generally uniform size, or can be polydisperse, that is, of various sizes. If monodisperse, the droplets can, for example, vary in volume by a standard deviation that is less than about plus or minus 100%, 50%, 20%, 10%, 5%, 2%, or 1% of the average droplet volume.

In some embodiments, the method further comprises contacting the dispensed effluent with a surface. In some embodiments, the method further comprises moving the surface relative to the discharge outlet. In some embodiments, the method further comprises moving the discharge outlet relative to the surface. The surface can be a hydrophobic material or a hydrophilic material. In some embodiments, the surface includes a blotting membrane.

Figure 8:
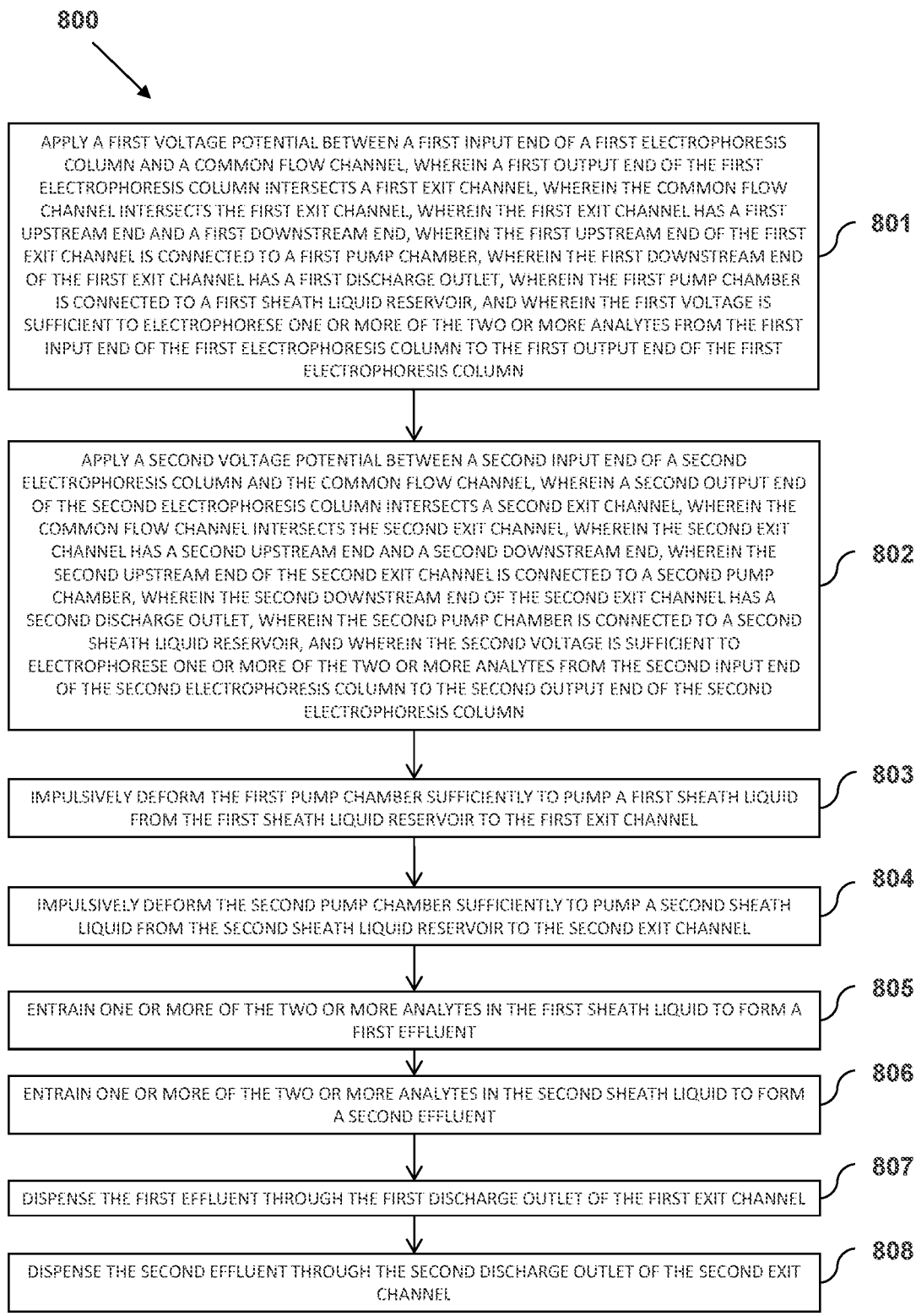
FIG. 8 is a flowchart of a process for separating and dispensing analytes from two electrophoresis columns in accordance with an embodiment.

FIG. 8 presents a flowchart of a process 800 for dispensing two or more analytes from two electrophoresis columns. In operation 801 a first voltage potential is applied between a first input end of a first electrophoresis column and a common flow channel. A first output end of the first electrophoresis column intersects a first exit channel, and the common flow channel intersects the first exit channel. The first exit channel has a first upstream end and a first downstream end. The first upstream end of the first exit channel is connected to a first pump chamber, and the first downstream end of the first exit channel has a first discharge outlet. The first pump chamber is connected to a first sheath liquid reservoir. The first voltage is sufficient to electrophorese one or more of the two or more analytes from the first input end of the first electrophoresis column to the first output end of the first electrophoresis column.

In operation 802, a second voltage potential is applied between a second input end of a second electrophoresis column and the common flow channel. A second output end of the second electrophoresis column intersects a second exit channel, and the common flow channel intersects the second exit channel. The second exit channel has a second upstream end and a second downstream end. The second upstream end of the second exit channel is connected to a second pump chamber, and the second downstream end of the second exit channel has a second discharge outlet. The second pump chamber is connected to a second sheath liquid reservoir. The second voltage is sufficient to electrophorese one or more of the two or more analytes from the second input end of the second electrophoresis column to the second output end of the second electrophoresis column.

In operation 803, the first pump chamber is impulsively deformed sufficiently to pump a first sheath liquid from the first sheath liquid reservoir to the first exit channel. In operation 804, the second pump chamber is impulsively deformed sufficiently to pump a second sheath liquid from the second sheath liquid reservoir to the second exit channel. In operation 805, one or more of the two or more analytes are entrained in the first sheath liquid to form a first effluent. In operation 806, one or more of the two or more analytes are entrained in the second sheath liquid to form a second effluent. In operation 807, the first effluent is dispensed through the first discharge outlet of the first exit channel. In operation 808, the second effluent is dispensed through the second discharge outlet of the second exit channel.

The provided methods can further comprise moving the position of the surface relative to that of the dispensing device. The moving can comprise changing the location of the surface as the dispensing device is stationary. The moving can comprise changing the location of the dispensing device and the surface is stationary. The moving can comprise changing the locations of both the surface and the dispensing device. The moving can comprise changing the location of the surface in one direction and changing the location of the dispensing device in an orthogonal direction.

The number of electrophoresis columns and discharge outlets on a single chip can each independently be 2 or more, 3, or more, 4 or more, 5 or more, 6 or more, 7 or more, 8 or more, 9 or more, 10 or more, 15 or more, 20 or more, 25 or more, 30 or more, 35 or more, 40 or more, 45 or more, 50 or more, 60 or more, 70 or more, 80 or more, 90 or more, or 100 or more. In some embodiments, the number of electrophoresis columns and discharge outlets on a single chip is 10 or more. In some embodiments, the number of common flow channels on a single chip is n−1, where n is the number of electrophoresis columns on the chip.

Each reservoir of the apparatus can independently be connected to an off-chip reservoir. The volume of the off-chip reservoir can be at least 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, 200-fold, 300-fold, 400-fold, 500-fold, 600-fold, 700-fold, 800-fold, 900-fold, or 1000-fold larger than that of the on-chip reservoir. In some embodiments, an electrode can be located within an off-chip reservoir. Electrical continuity between the off-chip reservoir and the on-chip elements of the apparatus can be through connecting tubing or channels. Two or more reservoirs of the apparatus can each be connected to a common off-chip reservoir. A reservoir of the apparatus can be connected to two or more off-chip reservoirs. A reservoir of the apparatus can be connected to two or more off-chip reservoirs through a selection valve, The selection valve can be configured to connect a selected off-chip reservoir to the on-chip reservoir depending on a selected method step. For example, different off-chip reservoirs can be connected for steps associated with conditioning, cleaning, waste disposal, sample injection, sample separation, or sample dispensing.

The method can utilize a computing apparatus that is programmed or otherwise configured to automate and/or regulate one or more steps of the method provided herein. Some embodiments provide machine executable code in a non-transitory storage medium that, when executed by a computing apparatus, implements any of the methods described herein. In some embodiments, the computing apparatus operates one or more of the pressure of reservoirs, the flow of liquid through columns and channels, the activity of an impulsive pump actuator, the moving of the surface, or the moving of the dispensing apparatus.

The term "automated" refers to a device, action, or method carried out by a machine or computer without direct human control. In some embodiments, the device and method described herein is operated in an automated fashion. In some embodiments, the automated method has subjective start and end points, thus the term does not imply that all steps of the operation are carried out automatically.

Systems that incorporate the apparatus are also provided. Systems can include, for example, a power supply and power regulator to control the current and/or voltage to the first and second electrodes and the impulsive pump actuator. Additionally, pumps and/or pressure sources for regulating the flow of liquids, mechanisms for stirring or mixing liquids, and heating or cooling units can be included.

It is understood that all devices and methods described above can further comprise flow channels, pumps, and reservoirs in addition to the ones described. In some embodiments, each flow channel, pump, and reservoir on one side of the separation column is mirrored by a similar flow channel, pump and reservoir on the opposite side of the separation column. In this way, the device can have a substantially or approximately symmetrical configuration. In some embodiments, the device has an asymmetrical configuration.

Reference to a "first" component does not necessarily require that a second component be provided. Moreover reference to a "first", "second", or "third" component does not limit the referenced component to a particular location unless expressly stated. The terms "first", "second", and "third" when used herein with reference to elements or properties are simply to more clearly distinguish the two or more elements or properties and unless stated otherwise are not intended to indicate order.

The terms "about" and "approximately equal" are used herein to modify a numerical value and indicate a defined range around that value. If "X" is the value, "about X" or "approximately equal to X" generally indicates a value from 0.90X to 1.10X. Any reference to "about X" indicates at least the values X, 0.90X, 0.91X, 0.92X, 0.93X, 0.94X, 0.95X, 0.96X, 0.97X, 0.98X, 0.99X, 1.01X, 1.02X, 1.03X, 1.04X, 1.05X, 1.06X, 1.07X, 1.08X, 1.09X, and 1.10X. Thus, "about X" is intended to disclose, e.g., "0.98X." When "about" is applied to the beginning of a numerical range, it applies to both ends of the range. Thus, "from about 6 to 8.5" is equivalent to "from about 6 to about 8.5." When "about" is applied to the first value of a set of values, it applies to all values in that set. Thus, "about 7, 9, or 11%" is equivalent to "about 7%, about 9%, or about 11%."

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications, websites, and databases cited herein are hereby incorporated by reference in their entireties for all purposes.

What is claimed is:

1. A microchip electrophoresis dispensing apparatus comprising:
    an electrophoresis column having an input end and an output end, wherein the input end has an opening configured to accept a fluid sample;
    a first electrode proximate to and in fluidic connection with the input end;
    a terminating electrode in fluidic connection with the output end;
    a sheath liquid reservoir;
    a pump chamber connected to the sheath liquid reservoir;
    an impulsive pump element configured to deform at least a portion of the pump chamber;
    an exit channel having an upstream end connected to the pump chamber and a downstream end having a discharge outlet, wherein the output end of the electrophoresis column intersects the exit channel;
    a surface positioned across a gap from the discharge outlet; and
    a motor configured to move the surface or discharge outlet laterally with respect to one another,
    wherein the surface is not electrically held at a voltage with respect to the first electrode or terminating electrode, and
    wherein the impulsive pump element is configured to pump a sheath liquid from the sheath liquid reservoir to entrain analyte from the electrophoresis column and dispense the entrained analyte, as discrete droplets or a liquid stream, from the discharge outlet onto the surface.

2. The apparatus of claim 1 wherein the terminating electrode is within or upstream of the pump chamber.

3. The apparatus of claim 1 further comprising:
    a flow channel, wherein the flow channel intersects the exit channel, and wherein the terminating electrode is within the flow channel.

4. The apparatus of claim 1 wherein the electrophoresis column, pump chamber, and exit channel are integrated on a single monolithic chip.

5. The apparatus of claim 1 wherein the surface supports a blotting membrane.

6. The apparatus of claim 1 further comprising:
    a sieving matrix, wherein the sieving matrix is inside the electrophoresis column.

7. A method of dispensing one or more analytes from an electrophoresis column, the method comprising:
    applying a voltage potential between an input end of an electrophoresis column and an output end of the electrophoresis column, wherein the voltage potential continues outside of the output end and into an exit channel, wherein the output end of the electrophoresis column intersects the exit channel, wherein the exit channel has an upstream end connect to a pump chamber and a downstream end having a discharge outlet, wherein the pump chamber is connected to a sheath liquid reservoir, and wherein the voltage is sufficient to electrophorese one or more analytes from the input end of the electrophoresis column to the output end of the electrophoresis column;
    impulsively deforming the pump chamber, thereby pumping a sheath liquid from the sheath liquid reservoir to the exit channel;
    entraining the one or more analytes in the sheath liquid to form an effluent;
    dispensing the effluent through the discharge outlet of the exit channel;
    contacting the dispensed effluent with a surface, positioned across a gap from the discharge outlet, wherein the surface is not held at a voltage with respect to the exit channel; and
    moving the surface or discharge outlet relative to one another using a motor.

8. The method of claim 7 wherein the voltage potential continues outside of the output end of the electrophoresis column, through a portion of the exit channel, and into the pump chamber.

9. The method of claim 7 wherein the voltage potential continues outside of the output end of the electrophoresis column, through a portion of the exit channel, and into a flow channel, wherein the flow channel intersects the exit channel.

10. The method of claim 7 wherein the dispensing creates one or more droplets.

11. The method of claim 7 wherein the dispensing creates a liquid stream.

12. The method of claim 7 wherein the surface supports a blotting membrane.

13. The method of claim 10, wherein the average volume of the one or more droplets is less than about one nanoliter.

14. A microchip electrophoresis dispensing apparatus comprising:
    an electrophoresis column having an input end and an output end, wherein the input end has an opening configured to accept a fluid sample;
    a first electrode proximate to and in fluidic connection with the input end;
    a terminating electrode in fluidic connection with the output end;
    a sheath liquid reservoir;
    a pump chamber connected to the sheath liquid reservoir;
    an impulsive pump element configured to deform at least a portion of the pump chamber;
    an exit channel having an upstream end connected to the pump chamber and a downstream end having a discharge outlet, wherein the output end of the electrophoresis column intersects the exit channel;
    a flat surface positioned across a gap from the discharge outlet, wherein the flat surface is positioned between 6 mm and 100 mm from the discharge outlet; and a motor configured to move the surface or discharge outlet laterally with respect to one another, wherein the impulsive pump element is configured to pump a sheath liquid from the sheath liquid reservoir to entrain analyte from the electrophoresis column and dispense the entrained analyte, as discrete droplets or a liquid stream, from the discharge outlet onto the flat surface.

15. The apparatus of claim 14 wherein the terminating electrode is within or upstream of the pump chamber.

16. The apparatus of claim 14 further comprising:
a flow channel, wherein the flow channel intersects the exit channel, and wherein the terminating electrode is within the flow channel.

17. The apparatus of claim 14 wherein the electrophoresis column, pump chamber, and exit channel are integrated on a single monolithic chip.

18. The apparatus of claim 1, wherein the deforming of the pump chamber generates an acoustic wave.

19. The method of claim 7, wherein the deforming of the pump chamber generates an acoustic wave.

20. The apparatus of claim 14, wherein the deforming of the pump chamber generates an acoustic wave.

* * * * *